(12) United States Patent
Hung

(10) Patent No.: US 6,443,408 B1
(45) Date of Patent: Sep. 3, 2002

(54) STAND UNIT FOR A FLAT PANEL DISPLAY

(75) Inventor: Yuan-Hsing Hung, Taipei (TW)

(73) Assignee: Chuntex Electronic Co., Ltd., Taipei Hsien (TW)

( * ) Notice: Subject to any disclaimer, the term of this patent is extended or adjusted under 35 U.S.C. 154(b) by 0 days.

(21) Appl. No.: 09/973,014

(22) Filed: Oct. 10, 2001

(51) Int. Cl.$^7$ ............................................... F16M 11/00
(52) U.S. Cl. ................ 248/176.1; 248/130; 248/276.1; 248/922
(58) Field of Search ............................ 248/176.1, 917, 248/919, 920, 921, 922, 923, 276.1, 130; 16/367

(56) References Cited

U.S. PATENT DOCUMENTS 6,189,842 B1 * 2/2001 Bergron Gull et al. . 248/919 X
6,189,850 B1 * 2/2001 Liao et al. .............. 248/917 X

OTHER PUBLICATIONS

US 2002/0011544 A1, Pub Date Jan. 31, 2002, Inventor Bosson.*

* cited by examiner

*Primary Examiner*—Ramon O. Ramirez
(74) *Attorney, Agent, or Firm*—Rosenberg, Klein & Lee

(57) ABSTRACT

A stand unit for a flat panel display consists of an L-shaped base, an annular shape hinge member pivotally mounted in a circular recess defined in an upper end of the base, and a swiveling member rotatably mounted around the hinge member and having a flat formed at one side thereof and a plurality of teeth integrally formed around the peripheries excluding the side of the flat. Whereby an LCD screen of the flat panel display is readily assembled on the stand unit by means of the plurality of teeth inserted into a slideway defined in a backside surface of a housing for the LCD screen. A flexible retaining piece integrated on the backside surface of the housing of the LCD screen springs out after the flat of the swiveling member has passed thereby and limits the swiveling member in the slideway.

7 Claims, 5 Drawing Sheets

STAND UNIT FOR A FLAT PANEL DISPLAY

BACKGROUND OF THE INVENTION

1. Field of the Invention

The present invention relates to a stand unit for a flat panel display, particularly to a stand unit having a simplified structure to facilitate assembly of the flat panel display and reduction of packaging and production cost.

2. Description of Related Art

There are mostly two types of display adapted for computers on the market, one is a CRT display having a cathode ray tube behind a screen, the other one is a flat panel display having an LCD screen supported an upper end of a stand unit.

Because the conventional CRT display has a cathode ray tube provided in a housing, it normally occupies a significant amount of space, and tends to be bulky and heavy.

There is one type of the flat panel display having the LCD screen integrated with the stand unit. Because the LCD screen is fixedly positioned with respect to the stand unit, this type of flat panel display apparently requires a large storage space in a package. In another conventional type of flat panel display, the LCD screen unit is detachably pivoted on a stand unit by means of a hinge unit, which enables the LCD screen to be adjustable to tilt in backward and forward directions, and to be rotatably adjustable in a side-by-side way.

However, conventionally, the structure of the stand units for the flat panel displays are all normally too complex, so that the flat panel display becomes difficult to assemble.

The parts of the flat panel display also require a large amount of storage space in the package, so that the packaging and production costs of the conventional flat panel display are high.

Therefore, it is an objective of the invention to provide an improved stand unit for a flat panel display to mitigate and/or obviate the aforementioned problems.

SUMMARY OF THE INVENTION

The main object of the present invention is to provide a stand unit for supporting an LCD screen of a flat panel display. The stand unit comprises an L-shaped base, an annular shape hinge member pivoted in a circular recess defined in an upper end of the base, a swiveling member rotatably mounted around the hinge member and having a flat formed at one side thereof and a plurality of teeth formed around peripheries excluding the side of the flat. Whereby the LCD screen of the flat panel display is readily assembled on the stand unit by means of the plurality of teeth inserted into a slideway defined in a backside surface of a housing of the LCD screen. A flexible retaining piece integrated on the backside surface of the housing of the LCD screen springs out after the flat of the swiveling member has passed thereby and limits the swiveling member in the slideway. Therefore structure of the stand unit is simplified, such that parts of the flat panel display occupy only a small storage space in a package, and thus the production cost of the invention is more economical than that of the conventional flat panel display.

Other objects, advantages and novel features of the invention will become more apparent from the following detailed description when taken in conjunction with the accompanying drawings.

DETAILED DESCRIPTION OF THE PREFERRED EMBODIMENT

Figure 1:
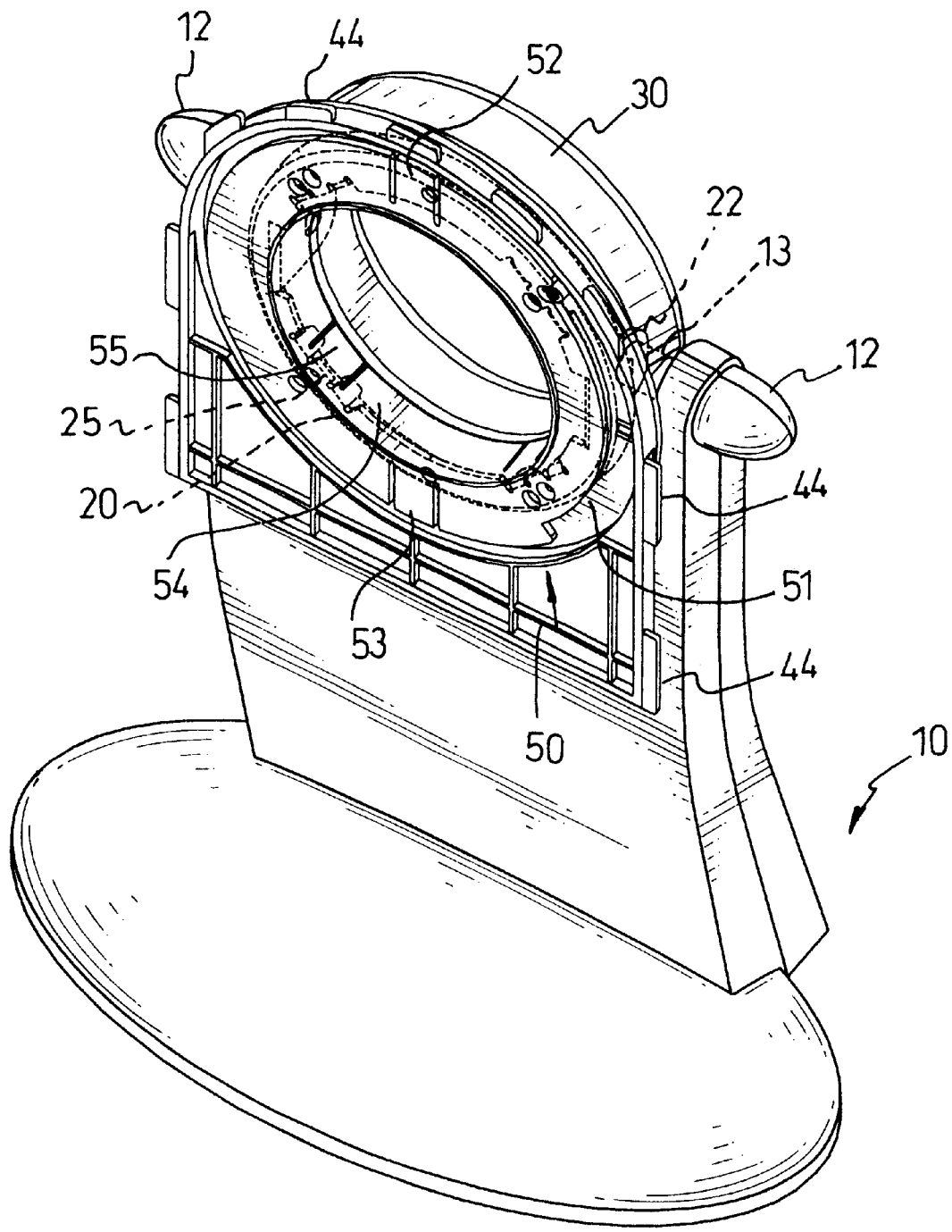
FIG. 1 is a perspective view of a stand unit for a flat panel display in accordance with the invention.
Figure 2:
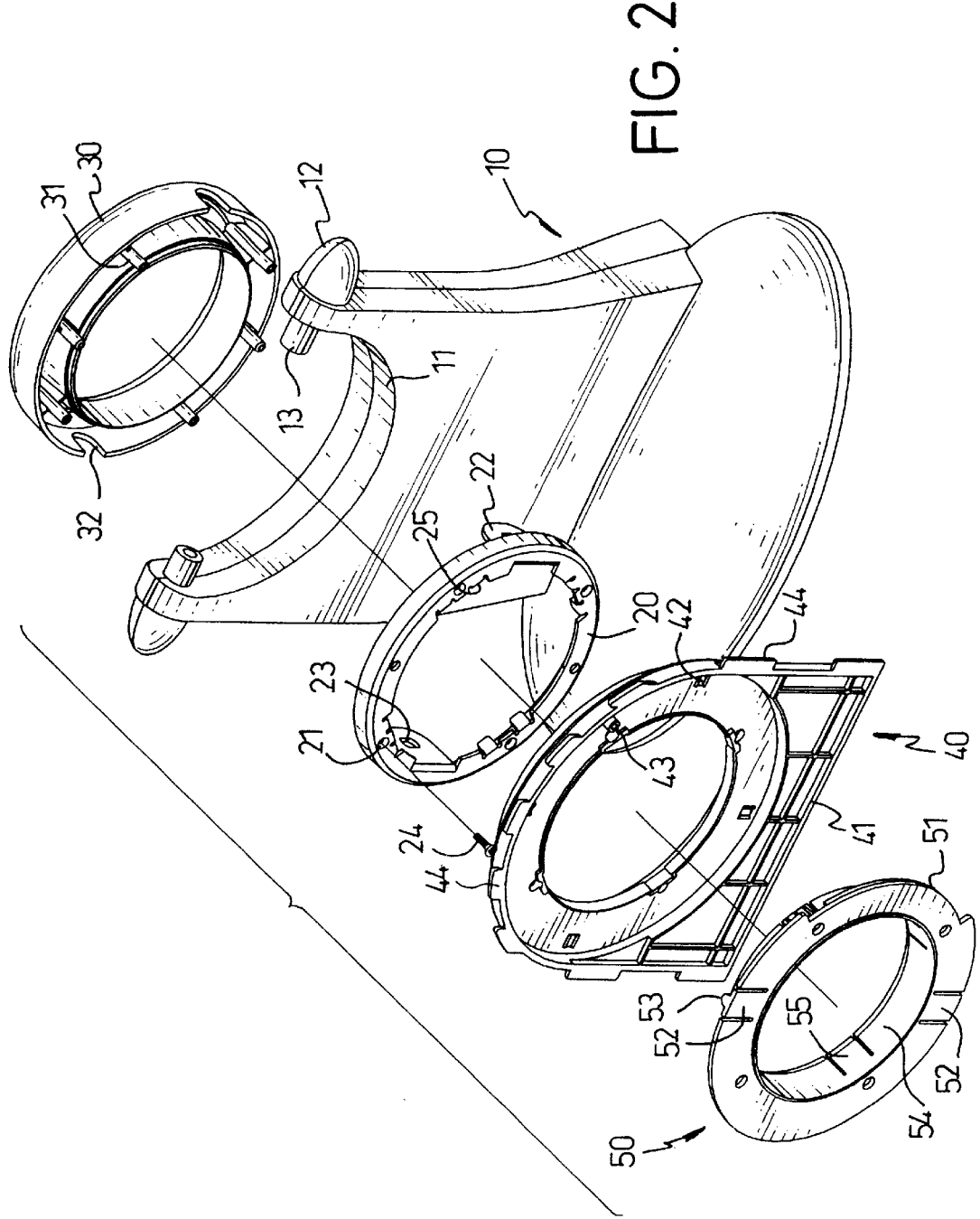
FIG. 2 is an exploded perspective view of the stand unit for the flat panel display in accordance with the invention.

As shown in FIGS. 1 and 2, the present invention relates to a stand unit for a flat panel display. The stand unit comprises an L-shaped base (10), a hinge member (20) pivoted on an upper end of the L-shaped base (10), a fixing seat (30) fixed on a rear end of the hinge member (20), and a swiveling member (40) rotatably mounted on a front end of the hinge member (20) and sandwiched between the hinge member (20) and a fixing plate (50).

The L-shaped base (10) is weighted to balance the flat panel display including an LCD screen and the stand unit. An upper end of the L-shaped base (10) is defined with a semi-circular recess (11) to permit the hinge member (20) to pivotally move therethrough. Two pivot bolts (12) are respectively provided at two opposite upper ends of the L-shaped base (10) and formed with two pivotal spindles (13), which are respectively horizontally extended inward through the two opposite upper ends of the L-shaped base (10).

The hinge member (20) is formed as an annular frame having a plurality of eyes (21) defined therein and distributed in equal space therearound, two pivotal bearings (22) formed at opposite sides thereof, and a plurality of fastening grooves (25) defined in an inner side surface thereof and distributed in equal space therearound. The two pivotal bearings (22) are respectively defined with two pivotal holes (23) corresponding to the two pivotal spindles (13), whereby the pivotal spindles (13) are respectively extended through the pivotal holes (23) of the pivotal bearings (22) and then engaged with two fasteners (not shown in the drawings) at free ends thereof to lock the hinge member (20) in pivotal connection with the base (10).

The fixing seat (30) is formed in an annular shape corresponding to the hinge member (20) and integrally formed with a plurality of screw posts (31) on a front end surface thereof corresponding to the plurality of the eyes (21). Two cuts (32) are respectively defined at opposite sides of the fixing seat (30) corresponding to the two pivotal bearings (22). The fixing seat (30) is securely fixed on a rear end of the hinge member (20) by means of a plurality of fastening elements (not shown in drawings) respectively extending through the plurality of eyes (21) and threadingly engaged into the plurality of screw posts (31), in this way the fixing seat (30) and the hinge member (20) are combined together and pivotally movable through the circular recess (11) in backward and forward directions.

Figure 3:
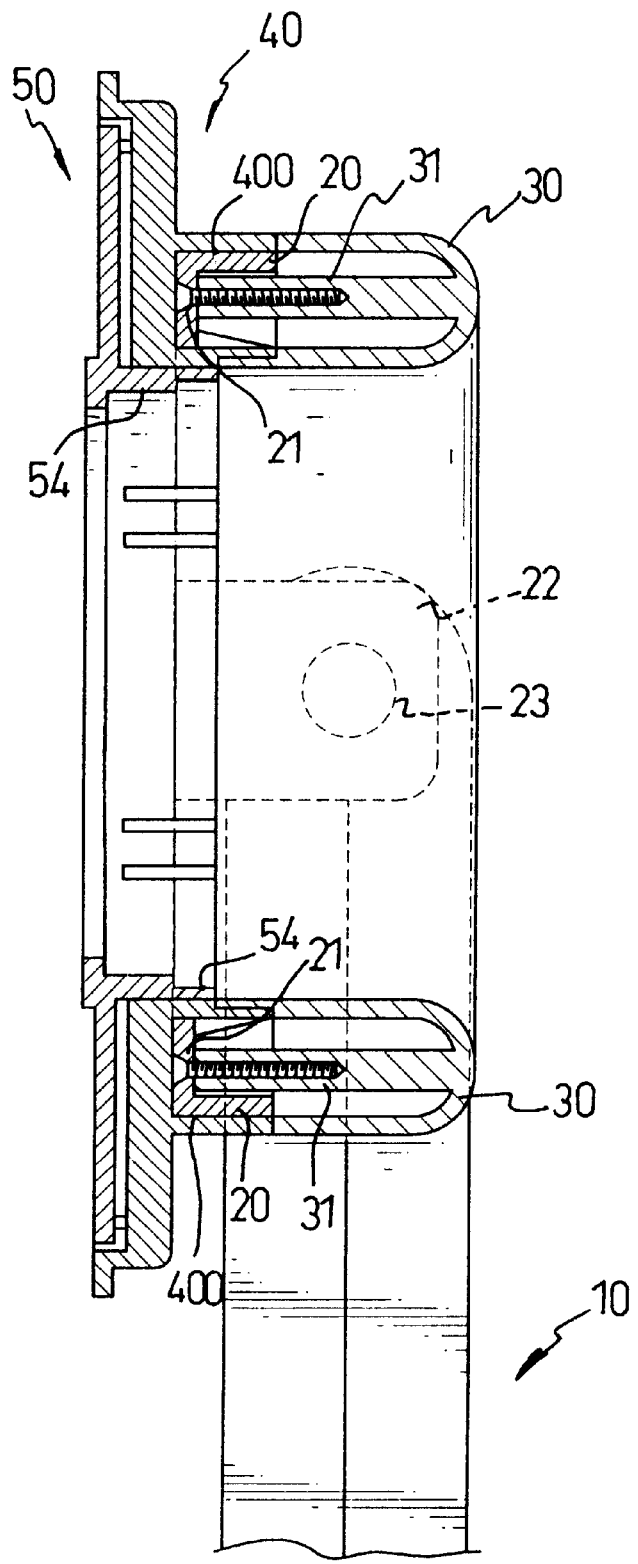
FIG. 3 a cross sectional view of the stand unit for the flat panel display in accordance with the invention.

Now with reference to FIG. 3, the swiveling member (40) has an annular groove (400) defined in a rear end thereof to receive the hinge member (20) rotatably fitted therein. As seen in FIG. 2, the swiveling member (40) further has a flat (41) formed at one side thereof, two positioning holes (42) defined symmetrically in the front end thereof, a stop stub (43) formed on the front end surface thereof, and a plurality of teeth (44) formed around peripheries excluding the side of the flat (41).

The fixing plate (50) has a cylindrical member (54) with a flange integrally formed around a front end thereof. The flange of the fixing plate (50) has a guide slot (51) defined with a sector having an angle of about 90° at one side in a middle position between two flexible pieces (52), which are respectively formed at two opposite sides of the fixing plate (50). The flexible pieces (52) are respectively formed with two positioning dots (53) on a rear end surface thereof corresponding to the positioning holes (42). The cylindrical member (54) is further formed with a plurality of flexible fastening pieces (55) corresponding to the plurality of fastening grooves (25). The flange of the fixing plate (50) is abutted against the front end of the swiveling member (40), while the positioning dots (53) are respectively inserted into the positioning holes (42), and the fastening pieces (55) are respectively engaged in the fastening grooves (25). The stop stub (43) is movably fitted in the guide slot (5 1), whereby the fixing plate (50) is fixedly connected with the hinge member (20), the swiveling member (40) is sandwiched between the hinge member (20) and the fixing plate (50) and rotatably movable around the hinge member (20) within a limiting range defined by the guide slot (51).

Figure 4:
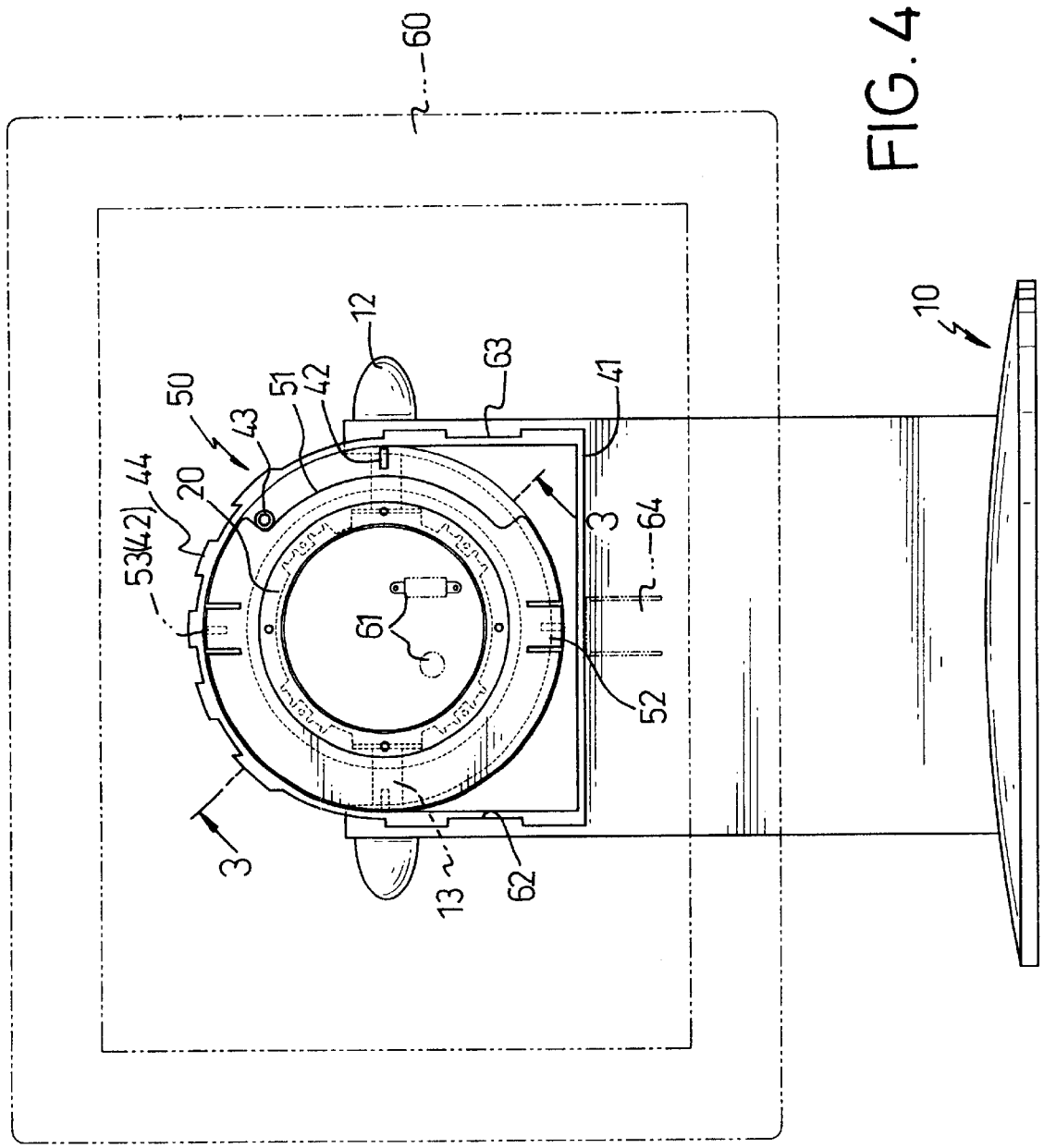
FIG. 4 is a front side view of the flat panel display supported on the stand unit of the invention in a horizontal orientation (landscape position)

As shown in FIG. 4, an LCD screen (60) having a width dimensioned larger than its height is supported on the stand unit and positioned in a horizontal orientation (landscape position). A slideway (62) is defined in a backside surface of the LCD screen (60) to let the plurality of teeth (44) be inserted therein. A plurality of sockets (63) is defined in peripheral inner sides of the slideway (62) corresponding to the plurality of teeth (44). A flexible retaining piece (64) springs outward after the teeth (44) of the swiveling member (40) are completely inserted through the slideway (62) into the sockets (63) and the flat (41) passed thereby to retain the swiveling member (40) fixed in the slideway (62), whereby the LCD screen (60) is securely supported on the stand unit. In the horizontal orientation, the stop stub (43) is abutted against an upper end of the guide slot (51) so as to retain the LCD screen (60) in the horizontal orientation.

Figure 5:
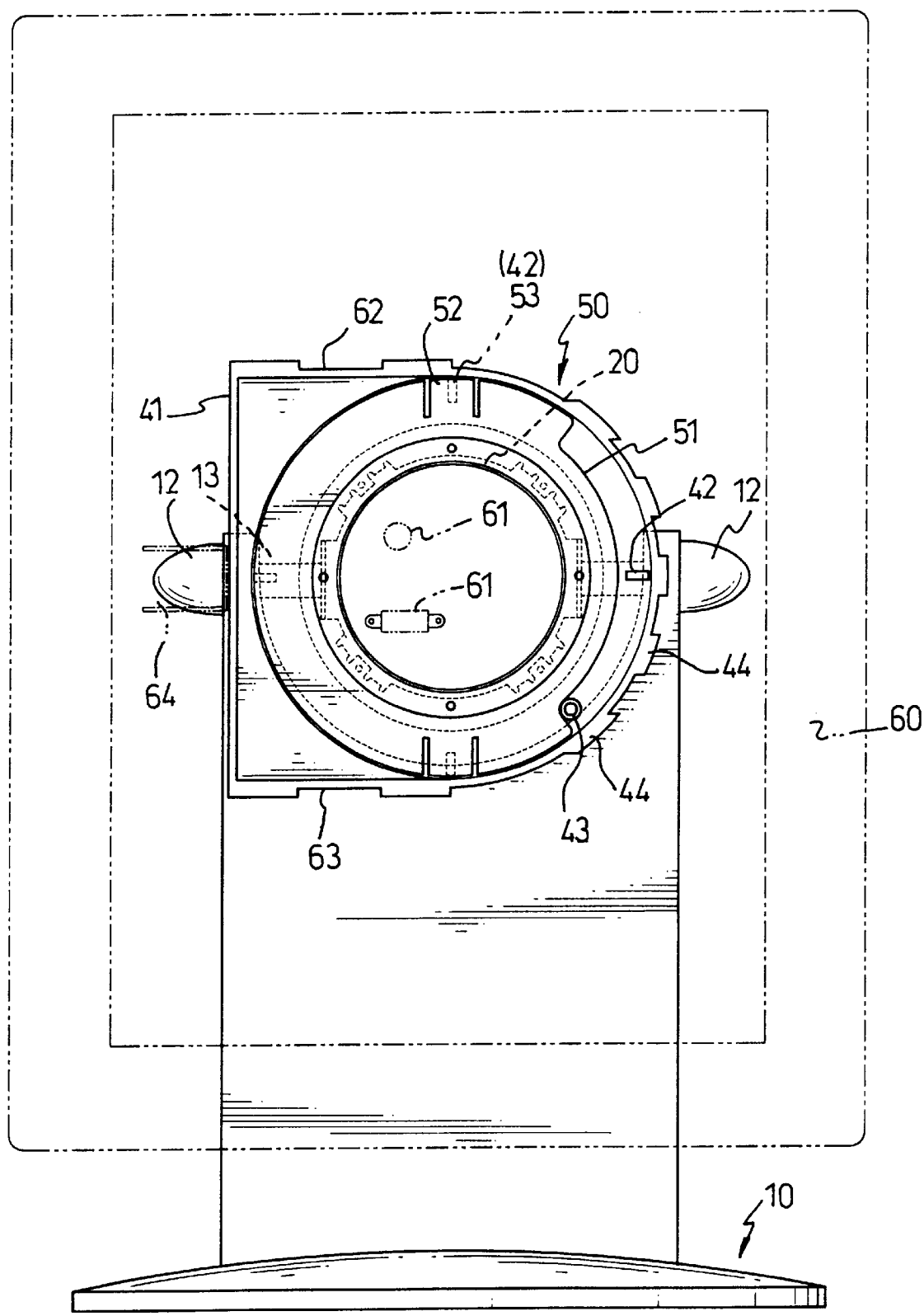
FIG. 5 is a front side view of the flat panel display supported on the stand unit of the invention in a vertical orientation (portrait position).

If the LCD screen (60) needs to be changed into a vertical orientation (portrait position), a user can readily force the LCD screen (60) from one side to carry the swiveling member (40) to swivel about 90° with respect to the hinge member (20) in a clockwise direction till the stop stub (43) presses against a lower end of the guide slot (51), so that the LCD screen (60) is changed from the horizontal orientation to the vertical orientation and retained in the vertical orientation, as shown in FIG. 5.

An important advantage of the stand unit for the flat panel display of the invention is that the structure of the stand unit is simple, and the LCD screen is readily assembled on and detached from the swiveling member (20) of the stand unit. Because parts of the stand unit and the LCD screen can be packaged in a small storage space in a package, the packaging and production costs become more economical than those of the conventional stand unit of the flat panel display.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stand unit for a flat panel display, wherein the stand unit comprises:
   an L-shaped base (10) having a circular recess (11) defined at an upper end thereof;
   a hinge member (20) formed as an annular frame having two opposite sides thereof pivoted at two opposite ends of the circular recess (11);
   a fixing seat (30) securely fixed on a rear end of the hinge member (20);
   a swiveling member (40) rotatably mounted on the hinge member (20) and having a flat (41) formed at one side thereof and a plurality of teeth (44) formed around peripheries excluding the side of the flat (41);
   the fixing plate (50) having a cylindrical member (54), fixedly connected with the hinge member (20) and a flange formed at a front end of the cylindrical member (54) and abutted against a front end of the swiveling member (40);
   whereby the swiveling member (40) sandwiched between the hinge member (20) and the fixing plate (50) is rotatably movable around the hinge member (20), the plurality of teeth (44) is adapted for inserting into a plurality of sockets (63) defined around peripheral inner sides of a slideway (62) defined in a backside surface of a housing of an LCD screen, and after the flat (41) has passed by a flexible retaining piece (64) integrated on the back side surface of the housing of the LCD screen, the flexible retaining piece (64) springs outward to press against the flat (41) so as to retain the swiveling member (40) fixed in the slideway (62).

2. The stand unit as claimed in claim 1, wherein two pivot bolts (12) are respectively provided at two opposite upper ends of the circular recess (11) and integrally formed with two pivotal spindles (13) extending horizontally and inward through the two opposite upper ends of the circular recess (11), the hinge member (20) has two pivotal bearings (22) formed at opposite sides thereof and two pivotal holes (23) respectively defined in the two pivotal bearings (22) corresponding to the pivotal spindles (13).

3. The stand unit as claimed in claim 1, wherein the hinge member (20) is defined with a plurality of fastening recesses (25) in equal space around an inner side surface thereof, and the cylindrical member (54) of the fixing plate (50) is formed with a plurality of flexible fastening pieces (55) corresponding to the plurality of fastening recesses (25).

4. The stand unit as claimed in claim 1, wherein the hinge member (20) is defined with a plurality of eyes (21) distributed in equal space therearound, the fixing seat (30) is formed in an annular shape corresponding to the hinge member (20), and has a plurality of screw posts (31) integrally formed on a front end surface thereof corresponding to the plurality of the eyes (21) and two cuts (32) respectively defined at opposite sides thereof corresponding to the two pivotal bearings (22), whereby the fixing seat (30) is securely fixed on a rear end of the hinge member (20) by means of a plurality of fastening elements (not shown in drawings) respectively extending through the plurality of eyes (21) and threadingly engaged into the plurality of screw posts (31).

5. The stand unit as claimed in claim 1, wherein the swiveling member (40) has an annular groove (400) defined in a rear end thereof to receive the hinge member (20) rotatably fitted therein.

6. The stand unit as claimed in claim 1, wherein the swiveling member (40) has two positioning holes (42) defined in a front end thereof, and the flange of the fixing plate (50) has two opposite sides thereof respectively formed with two flexible pieces (52) having two positioning dots (53) formed on a rear end surface thereof corresponding to the positioning holes (42).

7. The stand unit as claimed in claim 1, wherein a stop stub (43) is formed on the front end surface of swiveling member (40), and the flange of the fixing plate (50) has a guide slot (51) defined with a sector having an angle of 90° at one side in a middle position between two flexible pieces (52) to receive the stop stub (43) movable therein.

\* \* \* \* \*